United States Patent [19]
Daniels

[11] Patent Number: 4,796,566
[45] Date of Patent: Jan. 10, 1989

[54] CONVERTIBLE TETHERING SYSTEM

[76] Inventor: Thomas E. Daniels, 1603 Babcock, Suite 130, San Antonio, Tex. 78229

[21] Appl. No.: 53,155

[22] Filed: May 21, 1987

[51] Int. Cl.⁴ .............................................. A01K 1/04
[52] U.S. Cl. .................................. 119/124; 119/109; 119/117
[58] Field of Search ................. 119/96, 109, 116, 117, 119/124, 127; 273/184 B, 196, 197 R, 26 E, 200 B; 47/67

[56] References Cited

U.S. PATENT DOCUMENTS

| | | | |
|---|---|---|---|
| 147,928 | 2/1874 | Fry | 119/117 |
| 444,661 | 1/1891 | Carl | 119/121 |
| 642,567 | 2/1900 | Arsneau | 119/124 |
| 2,725,853 | 7/1952 | Nordheim | 119/124 |
| 3,088,438 | 9/1961 | Oliphant | 119/96 |
| 3,123,052 | 3/1964 | Marshall | 119/109 |
| 3,189,004 | 6/1965 | Sinclair | 119/124 |
| 3,315,642 | 4/1967 | Rogers et al. | 119/109 |
| 4,187,996 | 2/1980 | Ehrlich | 47/67 |
| 4,328,767 | 5/1982 | Peterson | 119/109 |

FOREIGN PATENT DOCUMENTS 93445 11/1983 Fed. Rep. of Germany ...... 119/109

Primary Examiner—Paul J. Hirsch
Attorney, Agent, or Firm—David G. Henry

[57] ABSTRACT

The present invention teaches a portable convertible tethering system which is centered around a retractable leash cartridge. The leash cartridge may be used alone to restrain children or animals while moving about, or alternatively, the cartridge may be placed in the system's housing which is attached to an anchoring device thereby becoming an integral part of a stationary tethering device. The housing is sized and shaped specifically for securely holding a portable retractable leash cartridge inside, yet is designed for simple insertion and removal of the cartridge. The housing has a lockable door for holding the leash cartridge inside against force or agitation. The housing is pivotally mounted on the anchor device so that the end of the cartridge from which the leach cord extends may follow that which is tethered; this capability reduces the likelihood that whatever is tethered, particularly an animal such as a dog, will not likely tangle the leash cord around the base of the system's anchor. The system's two-fold use of the retractable leash cartridge provides a user with the most economical avenue for having effective and convenient devices for both mobile and stationary tethering.

6 Claims, 3 Drawing Sheets

CONVERTIBLE TETHERING SYSTEM

BACKGROUND OF THE INVENTION

1. Field of the Invention

The present invention relates generally to tether and leash devices, and more specifically, to a convertible tethering system comprising a leash cartridge, capable of mobile use, and a anchor device-mounted housing for reversibly holding the leash cartridge in a fixed location and thereby becoming a stationary tethering device.

2. Description of the Prior Art

Tethering devices which are for permanent or semi-permanent, stationary installation are known in the art, as are such devices having tether cords which extend and retract and thereby resist entanglement. Such devices cannot, because of their bulky and/or cumbersome nature be used as a leash, such as for walking a dog. Conversely, leashes of various descriptions are known in the art, but may not be used as stationary, tangle-resistant, and sturdy tethers without undesirable or ineffective modifications.

Indicative of the present state of the art is U.S. Pat. No. 3,123,052, issued to H. E. Marshall, which discloses a reel-type retractable dog leash which is pivotally mounted upon a stake which is driven in the ground. While serving well as a tangle resistant stationary tether, Marshall's invention does not lend itself to use as a portable retractable leash because, in part, of its size, weight, and shape. Similarly, U.S. Pat. No. 642,567, issued to Arsneau; U.S. Pat. No. 2,725,853, issued to Nordheim; U.S. Pat. No. 3,088,438, issued to Oliphant; and U.S. Pat. No. 3,189,004, issued to Sinclair; are other examples of retractable tethering devices which are suitable only for permanent, stationary use, or at most only intermittent movement from one fixed location to another.

U.S. Pat. No. 4,328,767, issued to Peterson, is an example of the other end of the spectrum ranging from stationary tethering to portable leash devices. Peterson's device features a retractable leash, the cartridge of which is permanently attached to a dog collar. While serving well as a readily available portable leash, Peterson's device does not serve as a suitable stationary tether as it lacks features for stable mooring in a fixed location.

In summary, no single invention is known which provides features for use as a light-weight portable leash as well as features desirable for use as a stationary, tangle-resistant, and retractable tether. It would therefore be desirable and advantageous to devise a system providing such features.

SUMMARY OF THE INVENTION

The present invention provides convertible tethering system comprising a portable leash cartridge and an apparatus for reversibly securing the cartridge at a fixed location. The securing apparatus comprises a housing of a size and shape for securely holding the leash cartridge. The housing has a cartridge opening through which the cartridge is inserted and removed and a door which is attached to the housing for securing the cartridge therein. A door locking mechanism for use when the cartridge is inside the housing is also provided so that a tethered child, animal, or even an inanimate object such as a boat, may not dislodge the cartridge by excessive movement of force. One embodiment of the invention includes an auger for stably anchoring the apparatus in the ground. Other embodiments include substitutes for the augur such as clamps for clamping to above-ground objects, and suction cups for mounting to smooth surfaces such as automobile surfaces. The housing is pivotally mounted to the anchoring member so that the leash "follows" that which is tethered, thus resisting entanglement caused by movement of that which is tethered.

The invention, therefore, provides a novel and useful convertible tethering system, a portion of which (the leash cartridge), serves the dual purposes of restraining children or animals while moving about and serving as the retractable tether cord portion of the stationary tether configuration.

DESCRIPTION OF THE PREFERRED EMBODIMENT

Figure 1:
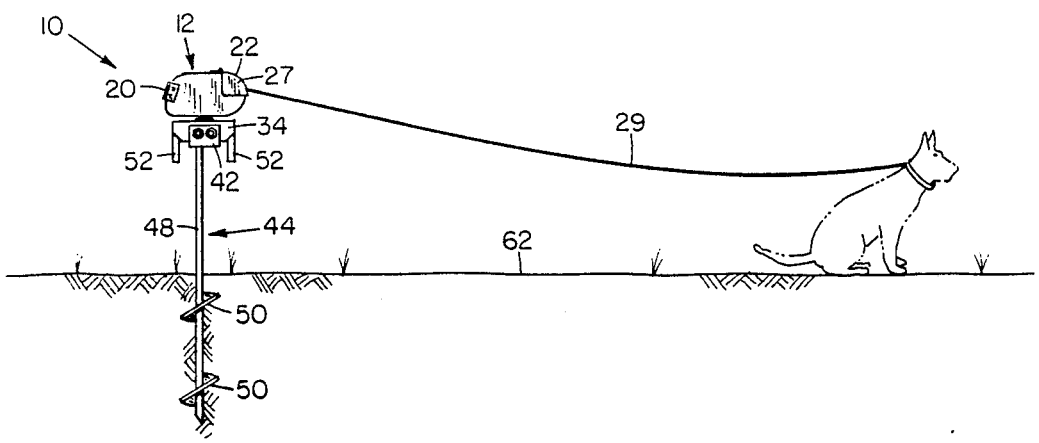
FIG. 1 is an elevational view of the anticipated use of the preferred embodiment of applicant's invention with the auger in place.

Referring in combination to FIGS. 1 through 5, the convertible tethering system is referred to generally by the reference numeral 10. A housing 12 is manufactured to have a size and shape which corresponds to the shape of a retractable leash cartridge 14. One such cartridge is sold by U.K Flexi Company under the Trademark "FLEXI 3". The leash cartridge 14 has a leash extending from it, and a mechanism on the interior of the cartridge (not shown) which causes the leash to be retracted within the cartridge when the appropriate control button 13 is pushed. The housing 12 has a cartridge opening 16 which is provided by leaving one of the two broad sides of the housing 12 open. To secure the cartridge 14 within the housing 12, a door 18 is attached to the housing 12 by means of a hinge 20. The door 18 is of a size and shape for at least partially obstructing the cartridge opening 16.

For securing the door 18 in a closed position, a locking mechanism consisting essentially of a U-shaped member 22 is attached to the housing 12 by means of a hinge 24. The hinge 24 is placed on the housing 12 such that the U-shaped member 22 may be pivoted and the arms 26 and 27 of the U-shaped member 22 may thereby be superposed, arm 26 over the door 18, and arm 27 over the back of the housing 12. Arm 26 thereby serves to hold the door 18 securely closed while arm 27 provides complementary support for the locking mechanism 22. The locking mechanism 22 is held in its locked position by frictional contact with the door 18 and with the back of the housing 12. The locking mechanism 22 has a cord opening 25 through which the leash cord 29 from the leash cartridge passes when in use.

Other locking designs may be used with the present invention, but the above-described design is believed to best suit the needs of effectiveness, simplicity of operation, and economy. For example, a locking device such a padlock hasp with a lock or pin through the eye could be used.

Referring again to FIG. 1, a control opening 36 is made in the top portion of the housing 12. The control opening 36 is for providing access to the control buttons 13 of the leash cartridge 14 through the housing 12. The access to the control buttons 13 provided by the control opening 36 makes adjustment of the tether length and acutation of the retracting mechanism possible while the leash cartridge 14 is secured within the housing 12.

Figure 4:
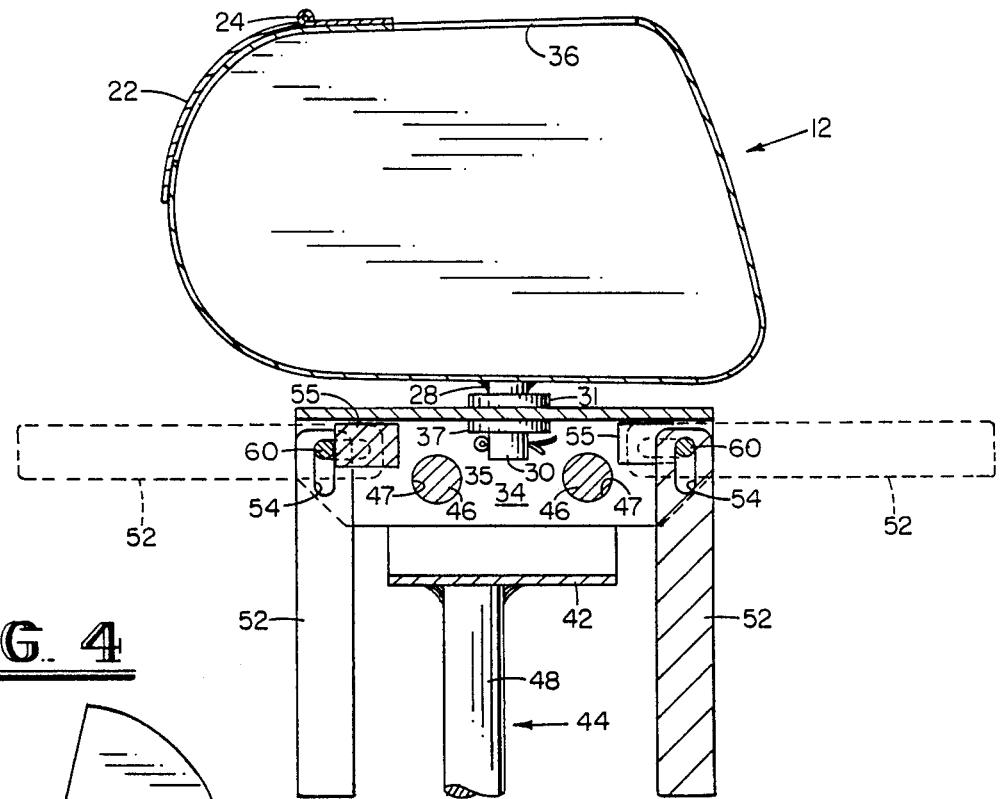
FIG. 4 is an elevational, partial cross-sectional view of the casing and casing mounting aspects of the preferred embodiment of applicant's invention.
Figure 5:
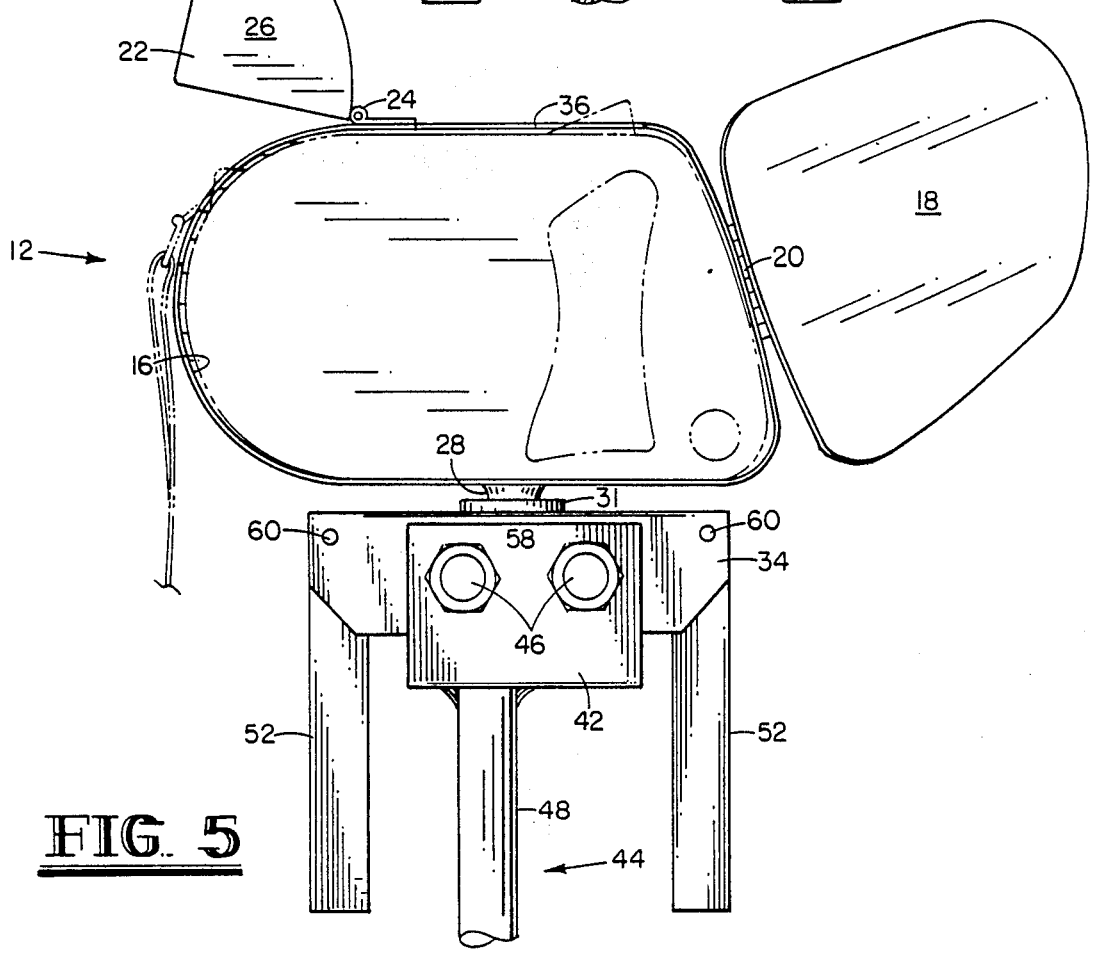
FIG. 5 is an elevational view of the casing of the preferred embodiment of applicant's invention with a leash cartridge in place within the casing.
Figure 6:
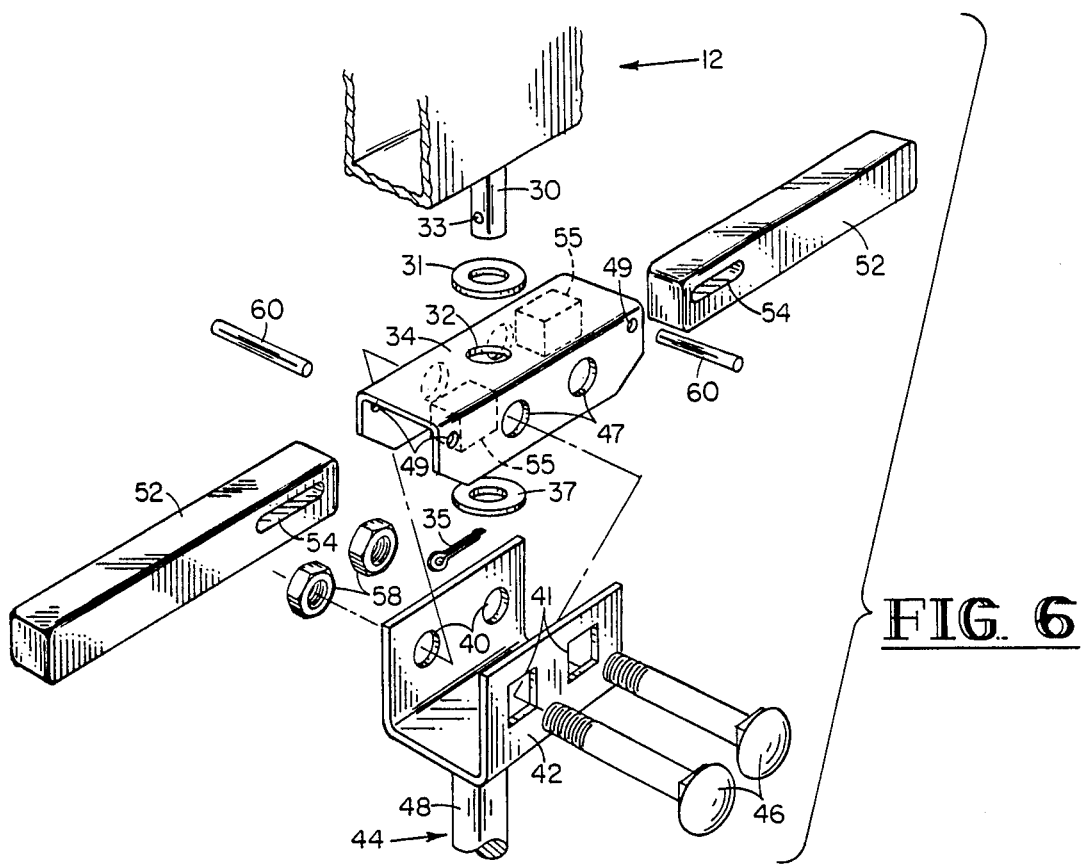
FIG. 6 is an exploded perspective view of the casing mounting and support members of preferred embodiment of applicant's invention.

Referring in combination to FIGS. 4 through 6, the preferred embodiment of the present invention teaches a stud 30 passing through a hole 32 in the housing support member 34. One end of the stud 30 is attached to the housing 12 by means of a weld 28. A hole 33 passes through the stud 30 near the end which passes through the housing support member 34. The hole 33 is for receiving a cotter key 35 which retains the stud 30 in position through the hole 32 of housing support member 34. Washers 31 and 37 are placed on stud 30 on either side of the hole 32 of the housing support member 34 to provide a rotating surface for the housing 12 and a retainer for the cotter key 35 respectively. This arrangement allows the housing 12 to pivot relative to housing support member 34, but nonetheless to be securely affixed thereto. The pivoting allows the portion of the leash cartridge 14 from which the leash cord 29 extends to "follow" that which is tethered with the device, thus lessening the possibility that the leash cord 29 will tangle around the apparatus 10. Such entanglement is a well known problem to any person who has tethered an animal for any length of time.

Referring again to FIG. 6, the housing support member 34 has holes 47 which correspond by size and spatial arrangement to the holes 40 and to the cartridge bolt holes 41 which pass through the mounting bracket 42 of an auger 44. Carriage bolts 46 pass through the holes 40, 41, and 47 thereby attaching the housing support member 34 to the auger 44. The carriage bolts 46 are held in place by nuts 58.

Figure 2:
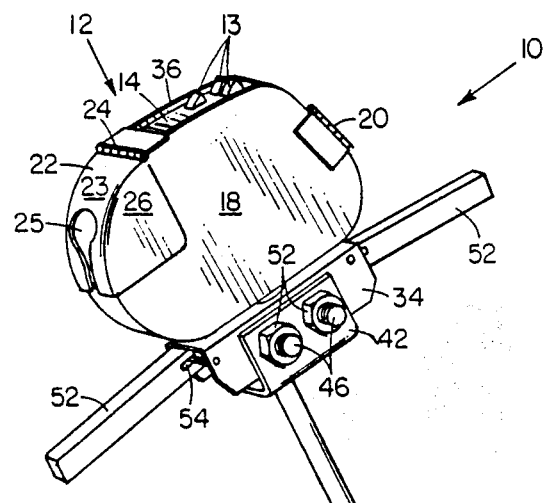
FIG. 2 is a perspective view of the preferred embodiment of applicant's invention with the auger in place.
Figure 3:
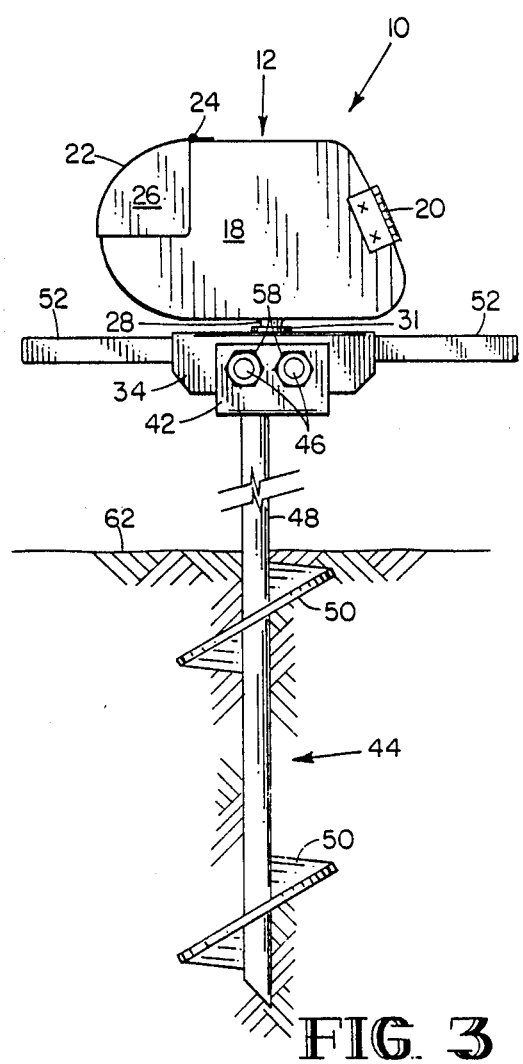
FIG. 3 is an elevational view of the preferred embodiment of applicant's invention installed in the ground using the auger.

Referring in combination to FIGS. 1 through 3, the auger 44 is of a common type such as is often used to anchor mobile homes to the ground. The auger 44 has a shaft 48 and one or more helical ribs 50 which thread into the ground 62. The auger 44 provides sufficient stability for the convertible tethering system 10 to resist the forces applied by even the largest household animals. This stability also makes the tether useful for horses and other large animals, as well as for inanimate objects such as boats.

Referring again to FIGS. 4 and 6, to aid in turning the auger 44 against the substantial resistance encountered when driving the auger 44 into or removing it from certain types of soil, two radially-extending but collapsible handles 52 are attached to the housing support member 34. The handles 52 may be made of channel iron, or an equivalent material. The handles 52 each have a slot 54 passing through the two opposing sides 56 of the handle 52 near the end of the handle 52 situated closest to the center of the housing support member 34. Two pivot shafts 60 pass through the interior of the housing support member 34 and one of the pivot shafts 60 passes through each of the slots 54. The pivot shafts 60 are welded into holes 49 in the sides of the housing support member 34 on either side of the handles 52. The movement of the handles 52, provided by the slots' 54 sliding on the pivot shafts 60, allows the handles 52 to slide into the housing support member 34 to the extent that they bind within the housing support member 34. The handles 52 are thereby held in an extended position. Spacer blocks 55 are mounted on the interior of the housing support member 34 to fill the space on the pivot shafts 60 not occupied by the handles 52.

Figure 7:
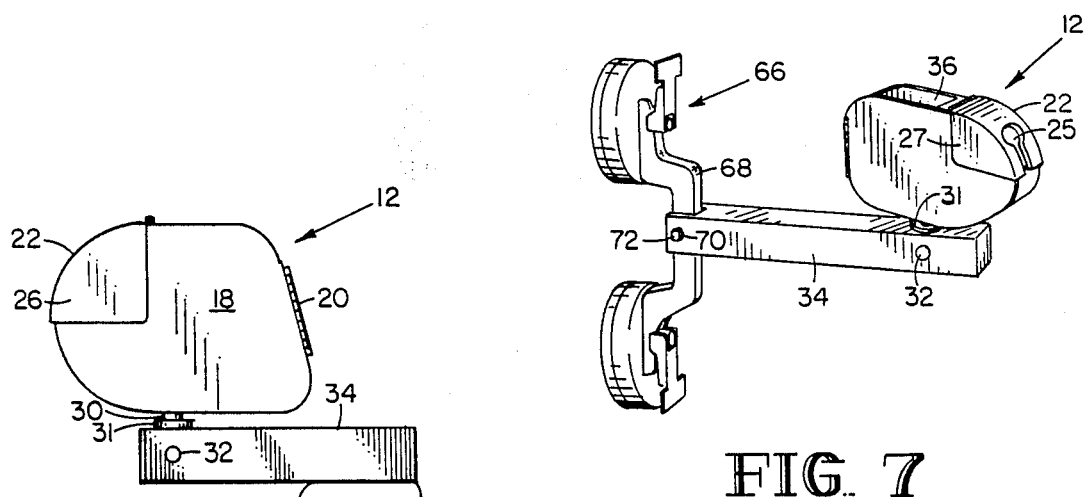
FIG. 7 is a perspective view of preferred embodiment of applicant's invention with the suction cup apparatus in place.

Referring to FIG. 7, an alternative embodiment of the present invention has, instead of the auger 44, a suction device 66, such as is used by window washers for high rise buildings. The suction device serves to attach the apparatus to smooth surfaces such as that of an automobile. For securely attaching the housing support member 34 to the suction device 66, the handle 68 of the suction device 66 has a hole therethrough (not shown) which corresponds to holes 70 through either opposing side of the housing support member 34 on one end opposite the end having the hole 32. A bolt 72, or its equivalent, passes through the holes 70 and the hole through the suction device handle 68 and is secured therethrough by a nut (not shown) or an equivalent. As with previous embodiments, the hole 32 serves to receive stud 30, and thereby attached the housing 12 to the hosing support member 34. It is noted that the housing support member 34 of this embodiment has additional holes 32 which serve to allow mounting the housing 12 in an appropriate orientation with respect to the plane of the suction cups, regardless of the manner in which the suction device 66 may be oriented.

Figure 8:
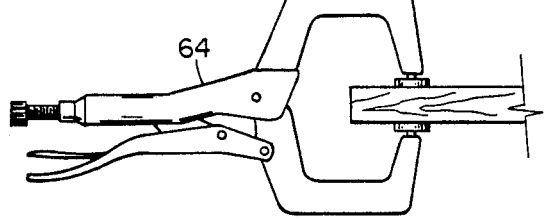
FIG. 8 is a perspective view of preferred embodiment of applicant's invention with the clamping apparatus in place.

Referring to FIG. 8, yet another alternative embodiment of the present invention has, instead of the auger 44 or the suction cup device 66, a clamp 64 which is welded to the housing support member 34. The clamp 64 is of the type available in most hardware stores such as that sold under the trademark VISEGRIP, and serves to attach the apparatus to objects having protrusions or shapes suitable for the use of such a clamp 64. As with the previously described embodiments, the housing support member 34 has a hole 32 into which the stud 30 is placed for securely attaching the housing 12 to the housing support member 34. The hole 32 is near an end of the housing support member 34 opposite the end to which the clamp 64 is attached. The stud 30 is secured therein by the cotter key 35. This embodiment also has additional holes 32 in the housing support member 34 for allowing proper orientation of the housing 12 regardless of the orientation of the clamp 64.

Although the preferred embodiment has been shown with a "VISEGRIP"-type clamping member, it should be emphasized that, for some applications, a C-clamp (not shown in the figures) may perform as well or better, and may make the production of the apparatus more economically feasible.

Although the preferred embodiment, as described above, has includes a housing for substantially enclosing the leash cartridge, the apparatus may include a clamping member of some kind (not shown) which merely securely grasps the leash cartridge. So long as this clamping member is pivotally mounted to the anchoring device, and so long as the clamping member holds the leash cartridge securely enough, the same benefits with the preferred embodiment may be expected.

Still other alternative embodiments of the present invention may be apparent to persons in the art, and it is intended that the claims be construed to include such additional embodiments.

I claim:

1. A tethering system for mobile and stationary use comprising:
    a portable leash cartridge having a casing, a leash extending therefrom, and cartridge means for retracting said leash within said cartridge;
    a housing for holding said leash cartridge, said housing having a cartridge opening for receiving and removing said leash cartridge and a leash cord opening for allowing a leash cord to pass from said cartridge through said housing;
    means for removably anchoring said housing in a fixed location, said housing being pivotally mounted to said anchoring means wherein said cartridge is useful for mobile restraint of an animal on said leash, and when held within said housing, is useful for tethering an animal on said leash at a fixed location without becoming entangled; and
    means for removably securing said leash cartridge within said housing, said securing means attached to said housing, said securing means comprising
        a door member hingedly attached to said housing being oriented, sized, and shaped to at least partially obstruct said cartridge opening when said door member is in a closed position; and
        a U-shaped member hingedly attached by a hinge to said housing having first and second arms, and oriented so said first arm may be superposed over a portion of said door member by pivoting said U-shaped member about said hinge when said door member is in a closed position, and said second arm may be superposed over an opposing portion of said housing by pivoting said U-shaped member about said hinge.

2. An apparatus for removably holding a portable leash cartridge comprising:
    a housing for holding said leash cartridge, said housing having a cartridge opening for receiving and removing said leash cartridge and a leash cord opening for allowing a leash cord from said cartridge to pass through said housing;
    means for removably anchoring said housing in a fixed location, said housing being pivotally mounted to said anchoring means for permitting an object to be tethered to said fixed location without becoming entangled;
    means for removably securing said leash cartridge within said housing, said securing means attached to said housing said securing means comprising
        a door member hingedly attached to said housing being oriented, sized, and shaped to at least partially obstruct said cartridge opening when said door member is in a closed position; and
        a U-shaped member hingedly attached by a hinge to said housing having first and second arms, and oriented so said first arm may be superposed over a portion of said door member by pivoting said U-shaped member about said hinge when said door member is in a closed position, and said second arm may be superposed over an opposing portion of said housing by pivoting said U-shaped member about said hinge.

3. An apparatus for removably holding a portable leash cartridge comprising:
    a housing for holding said leash cartridge, said housing having a cartridge opening for receiving and removing said leash cartridge and a leash cord opening for allowing a leash cord from said cartridge to pass through said housing;
    a door member for removably securing said leash cartridge within said housing, said door member attached to said housing;
    means for removably anchoring said housing in a fixed location, said housing being pivotally mounted to said anchoring means for permitting an object to be tethered to said fixed location without becoming entangled; and
    means for locking and unlocking said door member in a closed position, said locking means being attached to said housing, said locking means being a U-shaped member hingedly attached to said housing by a hinge and having first and second arms, and being oriented so said first arm may be superposed over a portion of said door member by pivoting said U-shaped member about said hinge when said door member is in a closed position, and said second arm may likewise be superposed over an opposing portion of said housing.

4. A tethering system for mobile and stationary use comprising:
    a portable leash cartridge having a leash cord extending from said cartridge, and a mechanism within said cartridge for retracting said leash within said casing;
    a housing being sized and shaped for holding said leash cartridge, said housing having a cartridge opening for receiving said cartridge within said housing, a cord opening for allowing a leash cord from said cartridge to pass through said housing, and a control opening permitting access to control buttons of said cartridge from outside of said housings;
    door member for removably securing said leash cartridge within said housing, said door member being hingedly attached to said housing and being sized and shaped to at least partially obstruct said cartridge opening;
    a solid and substantially cylindrically shaped member attached to said housing, said cylindrical member having a hole for insertion of a cotter key, said hole in said cylindrical member passing completely therethrough perpendicularly to a longitudinal axis of said cylindrical member;
    a cotter key passing through said hole in said cylindrical member for retaining said cylindrical member through a hole;
    an auger member for securely anchoring said apparatus in soil, said auger member having one or more helical ribs for engaging said soil;
    a housing support member having a plurality of holes in differing orientations relative to said housing support member, each said hole for allowing said cylindrical member to pass therethrough and hold said housing is a different orientation than any other said hole, said holes in said housing support member being of a size whereby said cylindrical member is secured therethrough when said cotter key is placed through said hole passing through said cylindrical member, said holes also for allowing said cylindrical member to turn in each said hole, said turning for allowing a tethered object to move about said system an be unlikely to entangle said leash cord, said housing support member further having holes for attaching said housing support member to an object by one or more nuts;

a bracket member attached to said auger, said bracket having one or more holes therethrough, each said hole for accepting a nut, said holes being places to correspond to said holes in said housing support member whereby a nut may pass to each hole in said housing support member and through each said hole in said bracket attached to said auger, thereby connecting said housing support member to said bracket;

handle means for imparting manual torque to said auger member, said handle means being operably connected to said auger member, and having means for reversibly holding said handle means in an operating position; and means for locking said door member in a closed position comprised of a U-shaped member hingedly attached by a hinge to said housing, said U-shaped member having a first, a second, and a transverse arm, said U-shaped member is oriented so that said U-shaped member may be pivoted about said hinge whereby said first arm may be superimposed over a portion of said door member when said door member is in a closed position and said second arm may be superposed over an opposing portion of said housing, said transverse arm has an opening for allowing said leash from said cartridge to pass through said U-shaped member, said transverse arm further having a slot opening to a perimeter of said transverse arm and connecting with said leash opening of said U-shaped member whereby a mid-portion of said leash may pass in and out of said leash opening.

5. A tethering system for mobile and stationary use comprising:

a portable leash cartridge having a casing, a leash extending therefrom, and cartridge means for retracting said leash within said cartridge;

a housing for holding said leash cartridge, said housing having a cartridge opening for receiving and removing said leash cartridge and a leash cord opening for allowing a leash cord to pass from said cartridge through said housing, said housing further having a control opening for operation of control buttons of said leash cartridge;

means for removably securing said leash cartridge within said housing, said securing means comprising a door member attached to said housing, and a U-shaped member hingedly attached by a hinge to said housing, said U-shaped member having a first, a second, and a transverse arm, said U-shaped member is oriented so that said U-shaped member may be pivoted about said hinge whereby said first arm may be superposed over a portion of said door member when said door member is in a closed position and said second arm may be superposed over an opposing portion of said housing, said transverse arm has an opening for allowing said leash from said cartridge to pass through said U-shaped member, said transverse arm further having a slot opening to a perimeter of said transverse arm and connecting with said leash opening of said U-shaped member whereby a mid-portion of said leash may pass in and out of said leash opening.

a suction device for suctional attachment to a substantially flat and smooth surface, said suction device for removably anchoring said housing in a fixed location, said housing being pivotally mounted to said suction device whereby said cartridge is useful for mobile restraint of an animal on said leash, and when held within said housing, is useful for tethering an animal on said leash at a fixed location without becoming entangled.

6. A tethering system for mobile and stationary use comprising:

a portable leash cartridge having a casing, a leash extending therefrom, and cartridge means for retracting said leash within said cartridge;

a housing for holding said leash cartridge, said housing having a cartridge opening for receiving and removing said leash cartridge and a leash cord opening for allowing a leash cord to pass from said cartridge through said housing, said housing further having a control opening for operation of control buttons of said leash cartridge;

means for removably securing said leash cartridge within said housing, said securing means comprising a door member means attached to said housing and a U-shaped member hingedly attached by a hinge to said housing, said U-shaped member having a first, a second, and a transverse arm, said U-shaped member is oriented so that said U-shaped member may be pivoted about said hinge whereby said first arm may be superposed over a portion of said door member when said door member is in a closed position and said second arm may be superposed over an opposing portion of said housing, said transverse arm has an opening for allowing said leash from said cartridge to pass through said U-shaped member, said transverse arm further having a slot opening to a perimeter of said transverse arm and connecting with said leash opening of said U-shaped member whereby a mid-portion of said leash may pass in and out of said leash opening, a C-clamp for frictional attachment to stationary objects, said C-clamp for removably anchoring said housing in a fixed location, said housing being pivotally mounted to said C-clamp whereby said cartridge is useful for mobile restraint of an animal on said leash, and when held within said housing, is useful for tethering an animal on said leash at a fixed location without becoming entangled.

* * * * *